United States Patent [19]

Mergan et al.

[11] 4,409,137

[45] Oct. 11, 1983

[54] SOLIDIFICATION OF RADIOACTIVE WASTE EFFLUENTS

[75] Inventors: Leo M. Mergan, Uccle; Jean-Pierre Cordier, Braine-Le-Comte, both of Belgium

[73] Assignee: Belgonucleaire, Brussels

[21] Appl. No.: 247,446

[22] Filed: Mar. 25, 1981

Related U.S. Application Data

[63] Continuation-in-part of Ser. No. 138,796, Apr. 9, 1980, abandoned, Continuation-in-part of Ser. No. 194,102, Oct. 6, 1980, abandoned.

[51] Int. Cl.[3] .......................... C09K 3/00; C09K 11/04

[52] U.S. Cl. .......................................... 252/632; 159/5; 159/DIG. 12; 252/628; 422/159; 159/11.1; 159/47.3

[58] Field of Search ............. 159/5, 11 R, 12, 47 WL, 159/49, DIG. 12; 252/628, 632; 422/159

[56] References Cited

U.S. PATENT DOCUMENTS

| | | | |
|---|---|---|---|
| 3,008,904 | 11/1961 | Johnson et al. | 376/412 |
| 3,195,868 | 7/1965 | Loomans et al. | 366/85 |
| 3,419,250 | 12/1968 | Brennan | 366/196 |
| 3,463,738 | 8/1969 | Fitzgerald et al. | 252/628 |
| 3,507,801 | 4/1970 | Kausz et al. | 252/628 |
| 3,557,013 | 1/1971 | Detilleux et al. | 252/628 |
| 3,618,902 | 11/1971 | Brennan | 366/301 |
| 3,838,061 | 9/1974 | Cuaz et al. | 252/628 |
| 3,883,441 | 5/1975 | Murphy et al. | 252/628 |
| 3,971,732 | 7/1976 | Meier | 252/628 X |
| 4,008,171 | 2/1977 | Tiepel et al. | 252/632 |
| 4,010,108 | 3/1977 | Gablin et al. | 252/628 |
| 4,040,973 | 1/1981 | Szivos et al. | 252/632 |
| 4,122,028 | 10/1978 | Iffland et al. | 252/628 |
| 4,123,380 | 10/1978 | Norell | 252/628 |
| 4,167,491 | 9/1979 | Gablin et al. | 252/628 |
| 4,168,243 | 9/1979 | Gablin et al. | 252/628 |
| 4,246,233 | 1/1981 | Sheeline | 422/159 |
| 4,274,962 | 1/1981 | Queiser et al. | 252/632 |
| 4,305,780 | 12/1981 | Black | 252/632 X |

*Primary Examiner*—Leland A. Sebastian
*Attorney, Agent, or Firm*—Pollock, Vande Sande and Priddy

[57] ABSTRACT

A process and apparatus for solidifying radioactive waste liquid containing dissolved and/or suspended solids is disclosed. The process includes chemically treating for pH adjustement and precipitation of solids, concentrating solids with a thin-film evaporator to provide liquid concentrate containing about 50% solids, and drying the concentrate with heated mixing apparatus. The heated mixing apparatus includes a heated wall and working means for shearing dried concentrate from internal surfaces and subdividing dry concentrate into dry, powdery particles. The working means includes a rotor and helical means for positively advancing the concentrate and resulting dry particles from inlet to outlet of the mixing apparatus. The dry particles may also be encapsulated in a matrix material. Entrained particles in the vapor stream from the evaporator and mixer are removed in an integral particle separator and the vapor is subsequently condensed and may be recycled upstream of the thin-film evaporator. A section of the mixer may be used for mixing dry particles with the matrix material in a continuous drying and mixing sequence. A section of the mixer also may be used for mixing the treating chemical with the waste liquid.

45 Claims, 11 Drawing Figures

SOLIDIFICATION OF RADIOACTIVE WASTE EFFLUENTS

RELATED APPLICATIONS

This is a continuation-in-part of application Ser. No. 138,796 filed on Apr. 9, 1980, now abandoned, and of application Ser. No. 194,102 filed on Oct. 6, 1980 now abandoned.

TECHNICAL FIELD

This invention relates to processes and installations for the solidification of liquid radioactive effluents from nuclear facilities, and more particularly to the solidification and encapsulation of low and medium level radioactive liquid wastes from nuclear power plants, nuclear research laboratories and reprocessing plants. The invention is especially useful for the concentration and solidification of relatively dilute, low level liquid wastes from light water reactors (LWR) such as pressurized water reactors (PWR) and boiling water reactors (BWR).

BACKGROUND ART

It is well-known to concentrate liquid wastes from LWR's to a limited extent and then to encapsulate such concentrates in various types of matrices such as cement, bitumen or synthetic resin polymers. The waste and matrix mix is then stored in containers. In order to further reduce the quantity of waste and the corresponding number of storage containers, it has been proposed more recently to completely dry the waste and encapsulate a dry product in the matrix material. The techniques being used and developed in an effort to reach a dry product before encapsulation are referred to broadly as "volume reduction".

In this specification, the terms "dried waste" and "dry product" mean waste solids which contain substantially no free water. Combined water, such as water of hydration or crystallization, may be present.

Because of the problems encountered with volume reduction as discussed below, many of the present waste treatment facilities still encapsulate some form of liquid concentrate. This practice leads to a large number of radwaste storage drums which must be stored temporarily above ground and then permanently disposed of, either at sea or by land burial. With present practices for encapsulating concentrate, waste from a 1,000 megawatt (MWe) PWR can lead to the accumulation of more than 2,000 standard drums for each year of normal operation. The waste from BWR's of the same power may require more than 3,000 standard drums per year. Extending such figures to the hundreds of existing and planned nuclear power plants, hundreds of thousands of drums will have to be stored and disposed of each year. For this reason, efforts to develop a satisfactory volume reduction technique have intensified in recent years.

Effective volume reduction can result in considerable savings, both in money and manpower, for a number of reasons. The amount of matrix material needed for encapsulation of a given quantity of waste is reduced where the waste is in dry solid form. Similarly, the quantity of waste that can be placed in each container is increased so that the number of containers necessary is also reduced. Either matrix encapsulation or placement of the waste in containers is considered to be a way of enveloping the waste in a protective envelope for purposes of this specification. As a conservative estimate, the final volume of enveloped waste arising from low level power plant effluents can be reduced by a factor of at least 5 to 15 by volume reduction techniques. A reduction in the number of storage containers produces a corresponding reduction in the capacities of the facilities needed for interim storage, container handling, container transportation, and ultimate disposal and in the manpower required for all such operations. As an example of the estimated cost savings for a 1,000 MWe PWR power station, considering the overall costs for conditioning, encapsulation and ultimate disposal at sea of 1 cubic meter of waste effluent containing 12 weight percent dissolved solids, the savings achievable with effective volume reduction is estimated to be in the range of $500 to $1,500 per cubic meter of effluent. Cost savings in this range will compensate within just a few years for the additional capital investment required for installation of a volume reduction system.

A further advantage of volume reduction is that it enhances safe handling and disposal of the waste material. Since smaller quantities of waste can be handled, stored, transported and ultimately disposed of permanently, there is realized a corresponding reduction in the hazards to personnel and a corresponding increase in the useful life of equipment. Safety to the environment is enhanced both by the smaller number of waste containers and the avoidance of any danger of a releasable water fraction containing radioactive ions.

Notwithstanding the known advantages of volume reduction, a number of difficulties have been encountered in developing an effective volume reduction technique. Attempts have been made to use thin-film evaporators as the drying apparatus in volume reduction systems. However, prior to reaching a dry state, waste concentrate becomes a heavy paste at solids levels in excess of 60 weight percent. This paste dries relatively slowly as a film, and in order to reach dryness in a thin-film evaporator a vacuum is used along with a relatively slow rate of material advancement along the heated surface. Such installations therefore require expensive auxiliary equipment to create the vacuum and the evaporator is not operated at an efficient throughput because the feed rate is limited by the drying rate of the film. In addition, the feed rate must be closely monitored and controlled so that drying occurs at or very near the evaporator outlet. Premature drying will cause blockage of transport passages and jamming of the evaporator rotor. Notwithstanding such control, blockage frequently occurs anyway after relatively short periods of operation due to the gradual buildup of hardened layers of concentrate at the heated wall surface, a condition which is aggravated by the slow rate of material advancement. Therefore, such equipment operates much more efficiently as a concentrator rather than as a dryer.

Other types of dryers have also been proposed for use in volume reduction systems, such as spray dryers and drum dryers. These types of dryers create large amounts of dust particles which are difficult to remove from exiting gas streams and can rapidly erode or jam gas treatment equipment. Spray dryers are further deficient in that solids can buildup in and around the spray nozzles and lead to blockage. Drum dryers are further deficient in that the dry layers formed on the heated drum can be difficult to scrape off or otherwise remove.

Although some of the foregoing problems might be alleviated by incomplete drying of the concentrate, significant moisture content in the waste product leads to problems in the characteristics of the encapsulated product. The presence of water in the radioactive fraction makes it difficult to control the quality of the final waste and matrix product. In other words, the amount of dry cement to be used to make up the final composition depends upon the total water in the waste and matrix mix and the amount of water in wet concentrate or partially dried solids can fluctuate and is difficult to control with any degree of accuracy. As a result, past practices often have led to either too much or too little water in the encapsulated product. Water is also extremely detrimental in a bitumen matrix as this matrix must be heated and the heated matrix causes water vapor to form which interferes with the encapsulating process. Water is also detrimental in most resin polymer matrices as it inhibits the polymerization reaction. For these reasons, the presence of water in the waste fraction results in a product having poor water resistance (because of the presence of non-fixed, leachable radioactive ions), poor chemical resistance, and inferior structural integrity (mechanical strength).

DISCLOSURE OF THE INVENTION

The present invention overcomes the foregoing deficiencies of the prior art and produces thoroughly dry solid waste particles at an unusually high rate. The particles may be encapsulated in a high integrity matrix. The chemical composition of the waste effluent to be solidified will vary depending upon its origin. The effluent is subjected to chemical treatment to adjust the pH to a basic range (greater than 7.0) and/or to form insoluble compounds by nucleation and/or precipitation of waste solids, which may be either suspended or dissolved in the waste liquid. If generated by a PWR, the effluent will usually contain boric acid and lime is the preferred chemical reagent for adjusting the pH and insolubilizing the solids of such effluents. Other metal hydroxides may also be used, such as the hydroxides of other alkaline-earth metals. If generated by a BWR, the effluent usually contains sulfates and the preferred chemical reagent is barium nitrate. Other effluents which can be treated by the present invention include those from the drains of laboratory facilities and other nuclear industry complexes and from other types of nuclear reactor facilities, such as low and medium, liquid wastes from spent fuel reprocessing plants.

Many effluents are first subjected to at least some degree of initial concentration in the waste treatment system of the generating facility, such as in a large capacity evaporator, prior to delivery for interim storage in a hold-up tank. The resulting hold-up tank liquid may contain dissolved and/or suspended solids in amounts up to about 10 to 25 weight percent. Chemical treatment of this hold-up tank waste may take place either in a mixing vessel to which is added the chemical reagent or by adding the chemical reagent directly to the special drying unit described below. Sufficient reagent is added to raise pH above 7.0, preferably into the range of 10 to 12. This reagent is added in a water solution state or in a dry state. The chemical reagent selected should bind radioactive ions into a solid mass upon drying and preferably produce insoluble salts capable of precipitating from solution as suspended solids either immediately or upon further concentration of the waste. In addition, the dried waste solids must be compatible with the matrix material and produce an encapsulated product having good mechanical strength and chemical resistance and a substantially non-leachable solid mix. Where the reagent is lime, it is preferably added in an amount between 30 and 100 weight percent relative to total solids in the effluent. Where barium nitrate is the reagent it is preferably added in an amount between 20 and 50 weight percent relative to total solids. If the reagent is added via a separate mixing vessel, the waste liquid is preferably stirred for approximately 30 to 60 minutes to thouroughly intermix the chemical reagent with the waste liquid. This hold-up time for reagent mixing is eliminated where the chemical reagent is introduced directly into the special dryer unit.

Either after or before chemical treatment, the waste is sent to a concentrator which is preferably of the thin-film evaporator type and may have either a vertical or horizontal configuration. Such evaporators have vanes or paddles mounted on a rotor which revolves at relatively high speed in the range of 400 to 1,000 rpm. Due to this rotational speed, the centrifugal force imparted to the waste material by the action of the vanes produces a relatively thin film upon an opposing wall which is heated to vaporize moisture from the film. Although wall temperatures may vary over a wide-range, they are preferably between 150° and 300° C. Such evaporators perform most efficiently with an outlet concentration in the range of 30 to 70 weight percent solids, preferably 40 to 60 weight percent, and most preferably at about 50 weight percent. The retained liquid in such concentrates allows the rotor to operate at its optimum speed, optimizes concentrate throughput, and avoids drying of the concentrate film to levels that can cause blockage of discharge passageways and jamming of the rotor.

Following concentration of the waste liquid in the evaporator, the resulting concentrate is sent to a special drying unit comprised of a mixing apparatus having a heated wall and a rotor with rugged paddles for both working a heavy concentrate and positively advancing this concentrate and the resulting dry material. Because the energy input levels required to perform such functions per revolution of the rotor are much greater than those of a thin-film evaporator, the mixer rotor revolves at a significantly slower rate, generally in the range of 25 to 75 rpm, preferably 40 to 50 rpm. In the mixer/dryer, the concentrate is heated to a temperature above 100° C., preferably in the range of 150° to 300° C. At these temperatures and at solids concentrations above about 50 percent, the concentrate forms a hardened layer or crust on heated surfaces and the strength of the paddles and the rotational speed of the rotor are such that this crust can be broken up into particles and dried without jamming the rotor or blocking transport passages. The working means also includes one or more helical members carried by the rotor to positively advance the concentrate and resulting dry particles. The helical member may be comprised of a blade or paddle canted relative to the axis of the rotor so as to impart positive axial thrust toward the mixer outlet. The mixing apparatus may further include self-cleaning means for removing hardened concentrate from the internal mixer elements.

By discharging the concentrate from the thin-film evaporator before it reaches a heavy, hard to work state, much higher rates of throughput can be employed. Instead, the heavy concentrate is dried in a heated mixing apparatus of rugged structural design capable of a vigorous mixing and shearing action at high throughput rates. In addition, the mixing and advancing elements cooperate with each other and with stationary surfaces and other elements in a self-cleaning action which shears, removes and grinds up the hardening layers of solids so as to prevent buildup on those elements and surfaces and produce a fine, powdery product. The mixer is thus used both for drying the concentrate and for breaking up hardened and caked layers of dried concentrate. Commercially available mixers of relatively small size are capable of performing these functions and completing the drying process at optimum efficiency. The heat capacity and length of the mixer is such that the dried waste solids reach the mixer outlet in the form of a free-flowing powder. It follows that the present invention makes optimum use of the operating characteristics of both a thin-film evaporator and a heated mixer to produce an optimum dried waste product.

The term "thin-film evaporator" also includes drying equipment which can be used as a concentrator, provided a relatively thin film is coated on the heated surfaces, and the film is not allowed to dry but is removed before the moisture content is reduced to below 30%. The thin-film concentrator may be of either a horizontal or vertical type. The preferred thickness of the concentrate film in the evaporator is in the range of 0.5 to 5 millimeters, preferably 1 to 3.

The moisture vapor produced both in the concentrating section of the evaporator and in the drying section of the mixer is passed through a separator apparatus for removing entrained solids and any carry over of liquid droplets. Although the separator may be separate from either the evaporator or the mixer/dryer, the evaporator preferably includes an integral particle separator section, and vapor from the mixer/dryer is vented back to the evaporator where it passes through the integral separator along with evaporator vapor. After removal of particulates, the overhead vapor stream, which may also contain non-condensable gases, is sent to an auxiliary gaseous treatment system of conventional design. There the condensable portion is cooled to produce condensate and the non-condensable gases are filtered and discharged to a controled ventilation system.

The dry particles of waste product discharged from the mixer/dryer may then be stored as such in a container envelope, such as a steel drum, or first mixed with a matrix material to encapsulate the dry particles. Encapsulation in effect provides a dual envelope for the radioactive solids, the first envelope being solidified matrix material and the second envelope being the container for receiving the waste and matrix mixture prior to matrix solidification. However, it is to be understood that a single envelope comprised of either the matrix material or the container may be sufficient, depending upon the regulations for handling and storage established by appropriate authority.

The mixing of dry waste powder with encapsulating matrix may be done either in a discontinuous manner (batch) or in a continuous manner. For batch mixing, a separate mixer receives a measured portion of dry waste particles and a measured portion of matrix material, the mixture being agitated until a substantially homogeneous mass is obtained. For a continuous encapsulation step, a separate mixer of the continuous type may be used in place of the separate batch mixer. However, an important feature of the present invention is that the last or downstream portion of the mixer/dryer may be used as an integral mixing section for continuously encapsulating the dry waste particles in an enveloping matrix. For this purpose, the heated jacket around the wall of the dryer is split into two parts or jackets, the upstream jacket providing normal heating over the first 50 to 70 percent of the mixer/dryer length. The downstream jacket surrounds a matrix mixing section. Hereafter in this specification a heated mixer without a matrix mixing section will be referred to as a "dryer" and the upstream heated section of a mixer with an integral matrix mixing section will be referred to as a "drying section".

The matrix mixing section may be heated only as necessary for incorporation of solid waste in a bitumen matrix. In this connection, the matrix mixing section may be cooled instead of heated so as to control the temperature of copolymerization of a resin polymer matrix as may be appropriate to improve the characteristics of the final encapsulated product. The incorporation of the waste in cement can usually be made at ambient temperature or below.

Because of the substantially moisture free nature of the dry particles exiting from the dryer or dryer section, it is possible to encapsulate an unusually high percentage of dry waste particles in the final matrix encapsulated product. The weight percentage of solid waste relative to the total mixture preferably falls within the range of 40 to 70 percent and may go as high as 75 percent without adversely affecting the characteristics of the encapsulated product. The maximum concentration of radioactive ions in the final dried product produced from LWR effluents usually falls within the range of 1 to 100 curies per cubic meter. However, higher radioactive concentrations may be realized where the waste treated is from other sources, such as reprocessing plants. Although all of these wastes can be solidified by the present invention, provided the chemical composition of the waste forms a dry, non-sticky solid compatible with the matrix material, encapsulation of high activity solids may be limited by radiation level requirements at the surface of the drum or other envelope.

A number of different materials may be used as the matrix for encapsulating such high percentages of solids. These include bitumen, resin polymers, and cement. The bitumen preferably has a penetration point in the range of 40 to 50. The preferred resin polymers are thermosetting polyester resins. Most preferably, they are thermosetting resins formed by polymerization reactions of unsaturated glycol monomers such as propylene glycol with orthopthalic acid and a vinyl monomer such as styrene.

The most economical matrix material per cubic meter of dry waste is believed to be cement which is estimated to cost less than bitumen by a factor of approximately 2 and less than synthetic resin polymers by a factor of about 10 to 15. Cement also has the advantage of permitting solids encapsulation to take place at ambient temperatures. The preferred cement is one having a high alumina content and a low content of calcium oxide and silicon dioxide (silica). The most preferred cement composition contains alumina in amounts equal to or greater than about 35 weight percent. Such cement gives after setting principally monocalcium aluminate; other constituents include the compound consisting of 12 parts calcium oxide and 7 parts aluminum oxide and the compound consisting of 2 parts calcium oxide and 1 parts silicon dioxide. There may also be smaller quantities of the compound consisting of 2 parts calcium oxide, 1 part aluminum oxide and 1 part silicon dioxide and the compound consisting of 1 parts calcium oxide and 2 parts aluminum oxide.

Another important feature of the invention is the incorporation of dry waste particles in cement and water. Previous volume reduction techniques resulted in a waste slurry that was only partially concentrated and contained a relatively high percentage of water. This water had to be taken into account in adding cement either in dry form or as a previously mixed slurry. Because of the relatively unknown and variable quantity of water in the waste prior to adding the cement, it was extremely difficult to control the quality of the final product and the ratio of added cement to total waste had to fall within a relatively narrow range to take into account the range of water that might or might not be present in the waste. This is a particular problem where the past practice has been to mix cement matrix material with a wet concentrate which provides at least part of the water needed for the final cement matrix. There have been occurrences in the past where the water fraction of the waste concentrate was not adequately fixed during the encapsulation process leaving dissolved radioactive ions free for possible release during subsequent handling or storage. Contrary to past practices, the solid waste particles of the present invention are in a dry state when mixed with the inorganic cement and the water. This step yields a much superior product over that where a portion of the water is provided by the waste material. The relative proportions of added cement and added water may vary over a relatively wide range without adversely affecting the superiority of this product.

The water may be added to the dried waste either with the cement as a premixed slurry or separately as an independent ingredient. Where there is continuous mixing of the matrix materials, such as when using the integral dryer/mixer, it is preferable to add the cement and water separately with the point of water addition spaced circumferentially and/or axially downstream from the point at which dry cement is added. The spacing between the points of addition is sufficient to avoid plugging of the line for cement addition. Where cement and water are premixed, the resulting slurry may solidify prematurely in the slurry addition line. For some applications, it may also be desirable to first form a dry mixture of dried waste particles and dry cement particles before free water is introduced into the mixing chamber. After introduction of the water, there is preferably sufficient downstream mixing to achieve a substantially homogeneous mixture of water, waste and cement.

Separate points of addition to the matrix mixing section may also be desirable when mixing the dried waste particles with the ingredients for forming a resin polymer matrix. For example, different monomers and other ingredients, such as hardeners, accelerators and/or catalysts, may be introduced into the mixing chamber at different points around the circumference and/or along the axis of the integral dryer/mixer.

Yet another important feature of the invention is the ability to eliminate or bypass a separate chemical treatment vessel and instead use an upstream portion of the special drying unit as a reagent mixing section for mixing with waste concentrate the chemical reagent for adjusting pH and/or insolubilizing the waste solids. This mode of operation is particularly advantageous where lime is used in the processing of PWR borates. Calcium borate is a thixotropic (gel-like) material and may stick to the walls of transfer lines if added upstream of the thin-film evaporator, particularly where space considerations make it desirable to have relatively long transfer lines between the evaporator oulet and the special drying unit.

The lime or other chemical reagent is preferably added in the dry state rather than as a water solution, thereby avoiding an increase in the quantity of water that must be evaporated by the solidification system. This elimination of the need for chemical solutions may improve the efficiency of the equipment and/or allow the use of smaller capacity equipment, with a resulting savings in operating and equipment costs.

The absence of moisture in the dry waste allows effective use of bitumen and resin polymers. Where the waste concentrate is poorly dried, the excess moisture generates water vapor when it contacts hot bitumen and the resulting boiling mass produces an undesirable foaming action. The effective use of resin polymers also prefers a well dried waste product as any excess moisture might interfere with the polymerization of the resin monomers and prevent the formation of an effective encapsulating material.

The invention allows also the further treatment of the dry waste particles in view of their final storage. Such treatment can include a calcination and/or encapsulation in a glass matrix.

The invention also lends itself to relatively easy and flexible operational control, which is preferably based on a water mass balance between the feed flow to the evaporator and the accumulated condensate from the combined vapor streams of the evaporator and the dryer. By differential comparisons between the weight of feed and the weight of accumulated condensate per unit time, the amount of dry solids per unit time can be determined knowing the average salts and/or solids content of the feed.

The amount of dried product being discharged from the dryer can also be measured continuously so that the amount of encapsulating matrix can be determined on a continuous basis. In the alternative, for batch operations, metering hoppers may be used to measure the weight of both the dry waste and the matrix material to be subsequently fed to the separate matrix mixing apparatus. It can thus be seen that the present invention optimizes the rate at which relatively dilute solids solutions can be dried, enhances continuous operation of process equipment without breakdown or flow interruption, and produces a dry and powdery solid waste product. The characteristics of the dry waste product are such that it may be encapsulated at high solids levels by matrix mixing operations. which are relatively flexible and easy to control, and which are relatively insensitive to the proportions of water and cement in the matrix material.

The encapsulation by any of the three matrices mentioned produces a solid waste product having unusually chemical and leach resistance. Where the matrix is cement or a polymer, the solid waste product has also exceptional high mechanical resistance. In addition, where the matrix is cement of the type specified, the matrix and waste mixture has the advantage of quick hardening at ambient temperature to yield a final product with high resistance to compressive failure (crushing) and thermal degradation (fire resistance).

Other advantages of the invention include the ability to treat radioactive solids either in solution or in suspension; to carry out and control each process step independently, providing flexibility and ease in adjusting process parameters in case of changing feed composition or changes in ambient conditions; to package dry waste solids alone for interim or permanent storage if encapsulation is not required by future waste handling techniques; to accommodate changes in encapsulating materials and equipment downstream of the dryer or the drying section; to carry out all process steps except chemical treatment and matrix encapsulation without constant operator surveillance; and to provide remote operation and control without particular problems, normal operations requiring no operator actions inside shielded areas. The process allows the use of commercially available equipment with minor adaptations and modifications. Process equipment is easily maintained, minimizing access requirements to shielded cells for maintenance or repair work. Equipment design and arrangements do not impose any unusual lay-out difficulties or hamper required accessibility, and decontamination of all equipment can be achieved through rinsing of internal surfaces with commercially available decontamination complexes and/or solvents. The present invention also has all of the previously discussed advantages inherent in volume reduction techniques.

BEST MODE FOR CARRYING OUT THE INVENTION

Figure 1:
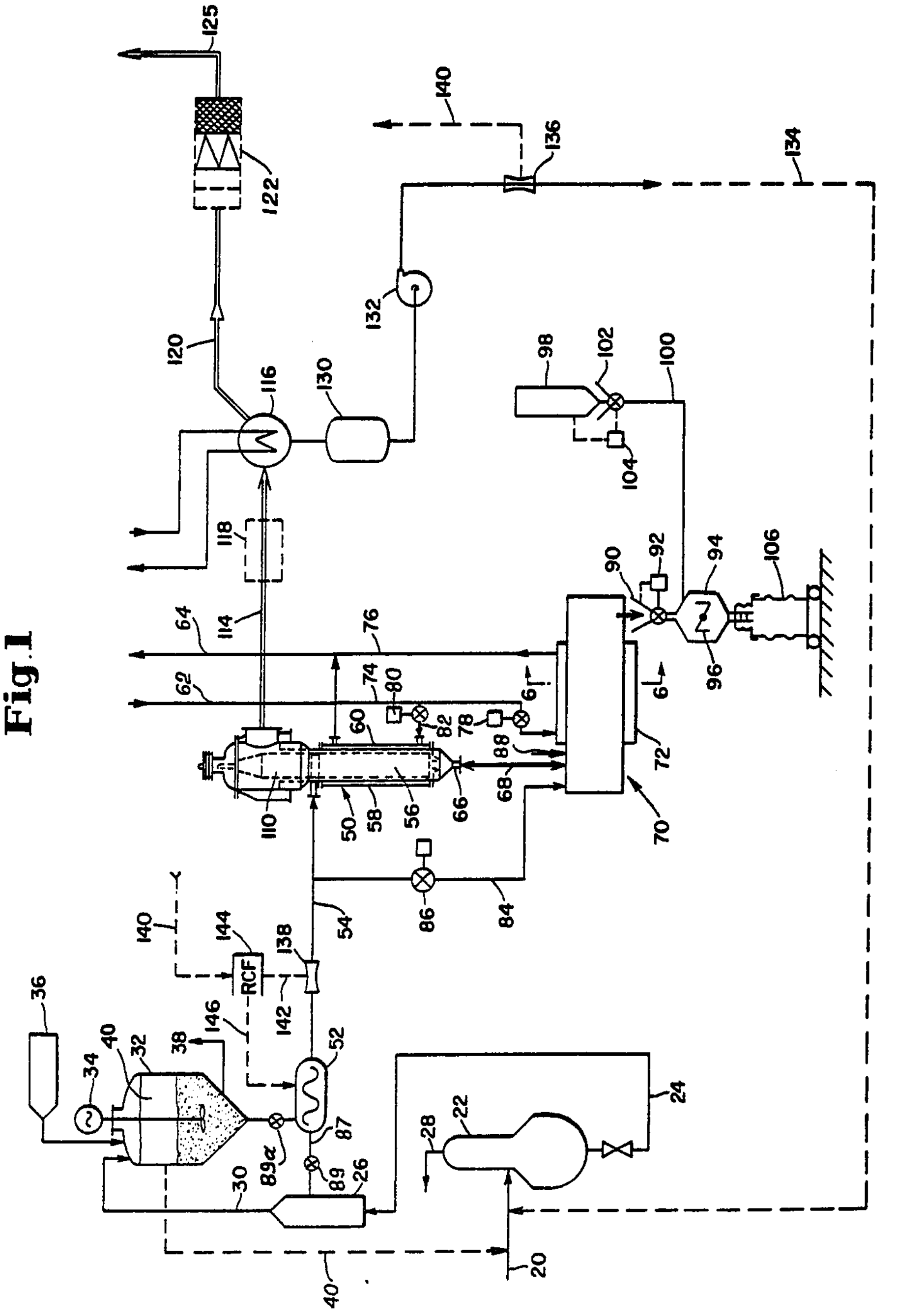
FIG. 1 is a schematic flow diagram illustrating the components for carrying out the invention and the conduits conveying materials between those components.

One preferred embodiment of the invention is illustrated diagrammatically in FIG. 1. Radioactive liquid effluent from a nuclear facility is fed by line 20 to a high capacity evaporator 22 before being discharged by line 24 to a hold up tank 26. Purified water decontaminated by evaporator 22 is discharged through line 28 to a controlled discharge system for releasing purified water to the environment. Evaporator 22 reduces the quantity of liquid waste that must be stored on site and this evaporator and hold up tank 26 may form part of the conventional waste treatment system for a nuclear power plant or other nuclear facility. If the amount of dissolved solids in the effluent is already relatively high (greater than about 10 weight percent), the high capacity evaporator may be omitted.

The liquid waste in hold up tank 26 will contain radioactive ions which may be in the form of dissolved solids, suspended solids, or a mixture of both. This waste liquid may be sent by line 30 to a chemical treatment vessel 32 having a stirrer 34 and a chemical reagent preparation tank 36. A sample line 38 provides a means for withdrawing a liquid sample to measure the quantity of dissolved and/or suspended solids in vessel 32. Upon the addition of lime or other appropriate chemical reagent to the liquid waste in vessel 32, suspended particles of insoluble salts may form, if not already present, and coagulate into a precipitate which can be allowed to settle to the bottom of the vessel by turning off the stirrer 34 for the desired settling time. A decanted liquid can then be separated from the settled layer of more concentrated solids by drawing off and recycling an upper liquid layer 40 to evaporator feed line 20. The preferred operating times for mixing a chemical reagent with the liquid waste are in the range of 30 to 60, minutes, and if decanting of the waste liquid is desired, settling times of 30 to 60 minutes are usually sufficient.

When the pH of the liquid waste has been adjusted into the preferred range for solidification, the waste is then transferred to a vertical thin-film evaporator 50 by means of a slurry pump 52 in connecting line 54. The thin-film evaporator has a rotor 56 and a cylindrical wall 58 which is heated by a jacket 60 to which a heating medium, such as steam, is supplied by line 62 and discharged through a line 64. In the thin-film evaporator, moisture is removed from the waste liquid to increase the concentration of dissolved and/or suspended solids so as to form a concentrate having a relatively high percentage of solids as compared to the feed liquid in line 54. However, the heat input and feed rate to this evaporator is controlled so that the level of solids at outlet 66 remains below 70 weight percent as previously explained.

The concentrate from the thin-film evaporator is discharged through a conduit 68 to a heated dryer 70 having internal mixing elements as described in greater detail below. The dryer has a jacket 72 so that at least a portion of the internal wall may be heated by the heating medium introduced into the jacket through line 74 and removed from the jacket by line 76. In the preferred embodiment, the heat flux and heated surface area are sufficient to completely remove moisture from the concentrate and form a dry solid waste material. The temperature of the heated surface area of both the dryer and the thin-film evaporator is chosen so as to achieve the desired level of moisture removal in the respective units for the optimum range of feed rates provided by pump 52.

It is also within the contemplation of the invention to separately vary the heat input to the evaporator and to the dryer by means of remote control valves 78 and 80 in lines 74 and 82, respectively. In addition, the heating medium for the evaporator and the dryer may be different, such as oil instead of steam, and may be supplied from different sources at different temperatures. Electrical heating means may also be used.

The operational flexibility of the system is further enhanced by a bypass line 84 containing a remote control valve 86. This line may be used to bypass evaporator 50 so as to transfer some or all of the waste liquid directly from chemical treatment vessel 32 to dryer 70. Bypass line 84 can be used to increase the flow of liquid waste through the dryer without increasing the flow sent to the evaporator 50, as may be desirable where a relatively high level of solids are already present in the waste liquid from treatment vessel 32, such as a solid content in the range of 20 to 50 weight percent or even higher. Bypassing the evaporator with a portion of the waste liquid may also be desirable if the dryer employed has a significantly greater heated surface area or operates at a significantly higher temperature than the evaporator.

The drying and throughput capacity of the dryer may also be selected so as to be capable of producing a dry waste product directly from waste feed containing solids concentrations of about 35% or greater. Accordingly, where upstream evaporation or upstream settling is especially effective and results in high solids concentrations in line 54, the entire discharge of pump 52 may be sent directly to the dryer without going through the thin-film evaporator. However, such solids concentrations in the waste liquid are unusual and are difficult to achieve without special concentration or settling techniques. Also, feed rates directly to the dryer are relatively low so that this component would not be used in its most efficient manner. Furthermore, the vapor stream exiting the dryer contains a high level of entrained dry particles and would require the use of a separate multi-stage particle separator, which is one of the less preferred alternatives as discussed below. A thin-film evaporator with an internal particle separator and a downsteam dryer of the type described is therefore considered the best mode for practicing the present invention.

A further embodiment of the invention is represented by a bypass line 87 between hold up tank 26 and pump 52, and a chemical addition line 88 for introducing chemical reagents, preferably in a dry state, directly into the dryer 70 as shown in FIG. 1. A similar chemical addition line 88*a* may also be used to introduce chemical reagents directly into the drying section of the integral dryer/mixer 160 of FIG. 2. Valve 89 in line 87 and valve 89*a* in the line between mixing vessel 32 and pump 52 permit liquid effluent from hold up tank 26 to bypass the separate chemical addition vessel 32 and be fed directly to thin-film evaporator 50 prior to the chemical treatment as provided by lines 88 and 88*a*. The lines 88 and 88*a* may feed into the same dryer inlet as line 68 or through a separate inlet peripherially or axially spaced from the inlet receiving concentrate from evaporator 50.

The dry, powdery waste material produced in the dryer 70 is sent to a metering hopper 90 controlled by a valve 92. When the material hopper is at least partly filled with dry particles, this waste material is then discharged batchwise and with a predetermined weight to a separate mixer 94 having an agitator 96. Depending on the weight of dry material to be discharged, the desired quantity of matrix material is made up in a matrix mixing tank 98 and sent to mixer 94 through a line 100. The matrix mixing apparatus may also include a metering hopper 102 arranged to automatically actuate a control valve 104 in line 100 so as to automatically discharge a predetermined amount of mixed matrix material to the matrix mixer. The dry solids and matrix material are then mixed for a sufficient period of time to intimately mix the dry particles and the matrix material and form a substantially homogeneous mixture which is then discharged to a storage container 106 in conventional fashion. It is to be understood that container 106 may be optional and that the mixture may instead be poured into a mold of desired configuration and hardened into a block capable of being handled without enclosure in a container. In this connection, the matrix material envelops practically all of the radioactive particles in a leach-resistant and chemical resistant envelope. Even though the particles at the surface of the solidified matrix may not be completely enclosed in matrix material, they may be sufficiently fixed, depending upon the matrix composition, to allow subsequent handling within applicable regulations. As another alternative, the mixer 94 may be omitted and the dry particles enveloped directly in the container 106 which may then be provided with a sealed cover and stored.

The moisture removed from the concentrate in the dryer 70 is vented as a vapor back to evaporator 50 through conduit 68 in countercurrent relation to the concentrate. Vapor from the dryer combines with vapor from the thin-film evaporator and then passes through an integral separator section 110 within the evaporator for removal of entrained particles of dry solids and moisture droplets. The overhead vapor from which entrained particles have been removed is sent by line 114 to a condenser 116 for separating moisture from noncondensable gases. Line 114 may optionally contain a particulate filter 118 for catching any particles which have not been removed by the particle separator. Noncondensable gases from condenser 116 pass through a line 120 to a conventional ventilation system for controlled discharge to the atmosphere. The ventilation system includes a bank of high efficiency filters 122 and a discharge stack 125.

The particle separating function performed for both the dryer and the evaporator by the evaporator separator 110 reduces the entrainment of dry particles and water droplets in the vapor leaving the dryer from about 50 to 100 grams per cubic meter in conduit 68 to less than about 0.001 grams per cubic meter in evaporator vapor line 114. Although an entirely separate particle separator unit may be employed as previously indicated, a relatively expensive multiple stage unit would be necessary to achieve the same removal factor.

Condensate from condenser 116 is sent to a condensate tank 130 for providing a suction head to a pump 132 for removing the low activity level condensate from the waste solidification system. Depending on its activity levels, the condensate may be transferred to the controlled release system for decontaminated fluids or recycled through a line 134 to feed line 20 of the high capacity evaporator 22.

For purposes of operational control, the flow of condensate from pump 132 is measured by a flow sensor 136 and the flow of chemically treated liquid waste feed is measured by a flow sensor 138 in line 54. The respective flow signals are transmitted by instrument lines 140 and 142, respectively, to a recorder and control unit 144 which compares the signals and generates a control signal for regulating the speed of pump 52 through an instrument line 146.

Figure 2:
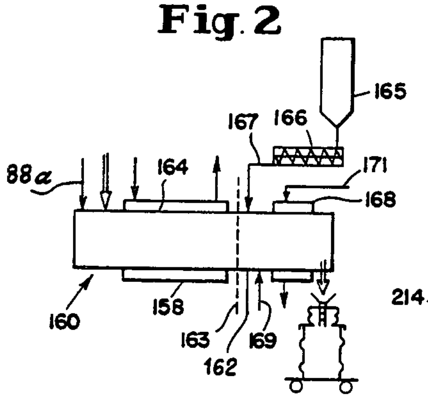
FIG. 2 is a schematic flow diagram illustrating a modification of the invention wherein a portion of the drying apparatus is used for mixing dried solid waste with an encapsulating matrix material instead of employing a separate mixer as in FIG. 1.

With reference to FIG. 2, there is shown a modification employing components for continuous encapsulation of the dry waste powder. In this embodiment, the heating jacket 158 of a modified dryer 160 extends only part way along the actual length of the dryer, preferably 50 to 70 percent of the operative length of the rotor of this component. The remaining 30 to 50 percent of the rotor length comprises a downstream matrix mixing section 162 commencing approximately at an imaginary line 163 which marks the end of the heated drying section 164. Matrix material is continuously fed to mixing section 162 from a preparation tank 165 by a screw conveyor 166 or some other type of positive displacement conveying mechanism for matrix materials. It is to be understood that the waste concentrate has been completely dried and formed into dry, powdery particles by the time the waste solids reach the mixing section 162 as defined by imaginary line 163. The rotor components of the matrix mixing section are preferably of the same configuration as the rotor components of the upstream dryer section, although the rotor and mixing elements of these sections may be different. While the dryer section jacket 158 is heated, the matrix mixing section preferably has an independent heat exchange jacket 168 which may be either heated or cooled as appropriate to give the optimum temperature for matrix mixing. Thus, the jacket 168 can be used to heat the mixing section wall when using bitumen to maintain its fluidity, or to cool the mixing section wall when using cement or resin polymers to prevent premature setting which might otherwise result from heat transferred from the dryer section.

A heating or cooling medium, such as steam or water respectively, is supplied to jacket 168 through a line 171.

Where the matrix material is cement, dry cement and water may be premixed in tank 165 and fed as a slurry through line 167 for single stage mixing with dried waste in mixing section 162. However, in another preferred embodiment, dry cement is fed directly to the mixing section 162 through line 167 separately from the water. Water is also fed directly to the mixing section 162 through a separate water feed line 169. The outlet of line 169 into the mixing chamber of dryer 160 is spaced axially downstream and/or circumferentially from the outlet of line 167.

Similarly, separate systems for the sequential addition of dry cement first and then water may be used with the batchwise encapsulation arrangement of FIG. 1. In this arrangement, matrix tank 98 and related compounds are modified so as to introduce dry cement batchwise into separate mixer 94. A separate metering hopper and water addition line to mixer 94 are provided for the batchwise addition of water (not shown).

Separate systems for the addition of different chemical ingredients may also be employed with the embodiments of both FIGS. 1 and 2 where the matrix material is a resin polymer.

Figure 3:
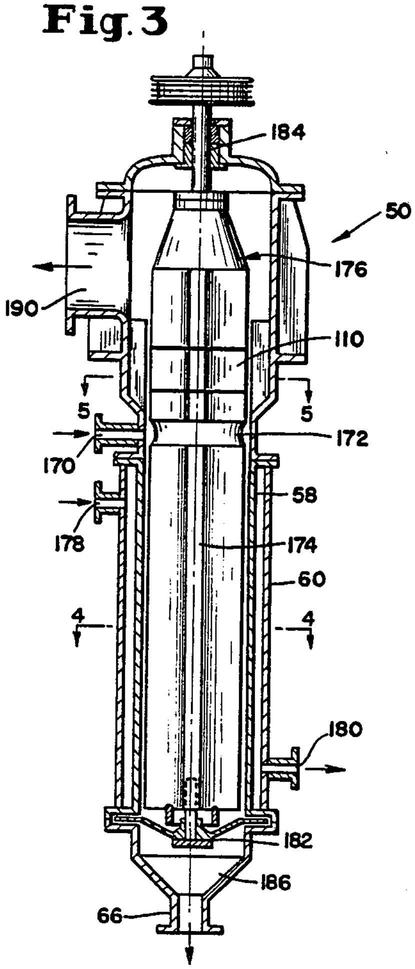
FIG. 3 is a diagrammatic view in sectional elevation of a preferred evaporator component.
Figure 4:
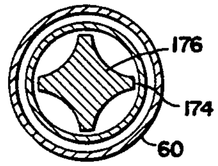
FIG. 4 is a cross-sectional view of the evaporating section of the evaporator component taken along line 4—4 of FIG. 3.

One preferred embodiment of the thin-film evaporator 50 is shown in FIG. 3. Waste liquid is fed through an inlet 170 to a distributor 172 which distributes the liquid around the inside perimeter of heated wall 58. The liquid then flows by gravity down the heated wall where it is wiped against the wall surface as a thin-film by the paddles or vanes 174 or rotor 176. The vanes may be integral with the rotor as illustrated in FIG. 4. Wall 58 is heated by jacket 60 to which steam is fed by a steam inlet 178 and from which steam is discharged by outlet 180. Rotor 176 is mounted at its lower end by bearing assembly 182 and at its upper end by a second bearing assembly 184. As the liquid waste travels downwardly as a thin-film spread over the cylindrical wall, moisture is driven off so that the solids are concentrated to form a concentrate which collects in a lower chamber 186 and is discharged therefrom through concentrate outlet 66. Concentrate outlet 66 is connected by conduit 68 to the concentrate inlet of the dryer as previously described. For an effective rate of drying compatible with the other components of the system, the thin-film evaporator used should preferably produce film thicknesses in the range of 0.5 to 5.0 millimeters, preferably 1.0 to 3.0 millimeters. Some commercially available units include means for controllably varying the film thickness and such units may be adjusted to produce film thicknesses in the foregoing ranges.

Figure 5:
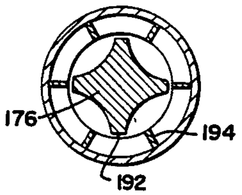
FIG. 5 is a cross-sectional view of the particle separator section of the evaporator component taken along line 5—5 of FIG. 3.

Although a separate particle separator may be employed, the preferred thin-film evaporator includes a particle separator section 110 for removing both liquid and solid particles entrained with the released moisture vapor. The hot vapor rises vertically between the paddles and exits the evaporator through a vapor outlet 190. In the embodiment shown, the particle separator includes an extension of the rotor 176 having vanes 192 which cooperate with wall mounted baffled 194 as illustrated in FIG. 5 to remove entrained particles.

Centrifugal thin-film evaporators of the type illustrated in FIG. 3 are manufactured by De Dietrich Company located in Niederbronn-Les-Bains, France, a preferred model being Type M. Other types of thin-film evaporators may also be employed, such as that illustrated and described in Defensive Publication No. T939,005 published on Oct. 7, 1975, the application of which is identified by Ser. No. 452,857 (series of 1970) and is expressly incorporated herein by reference. Other manufacturers include Sybron in Leven, Scotland; Luwa in Zurich, Switzerland; Kontro in Athol, Massachussetts, USA; Chemetron in Jeffersontown, Kentucky USA and Artisan Industries in Waltham, Massachussetts, USA.

Figure 6:
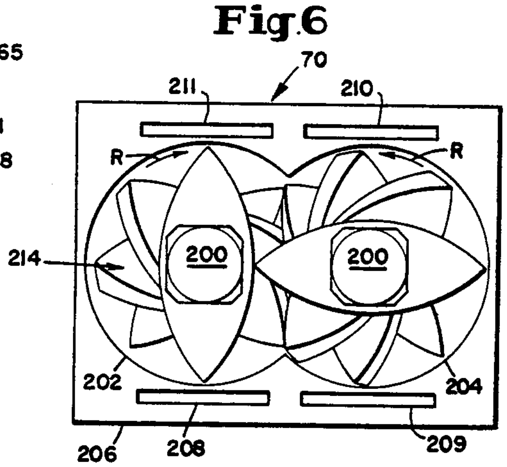
FIG. 6 is a cross-sectional view of the dryer component taken along lines 6—6 of FIG. 1 and showing a preferred type of rotor and mixing blade arrangement.
Figure 7:
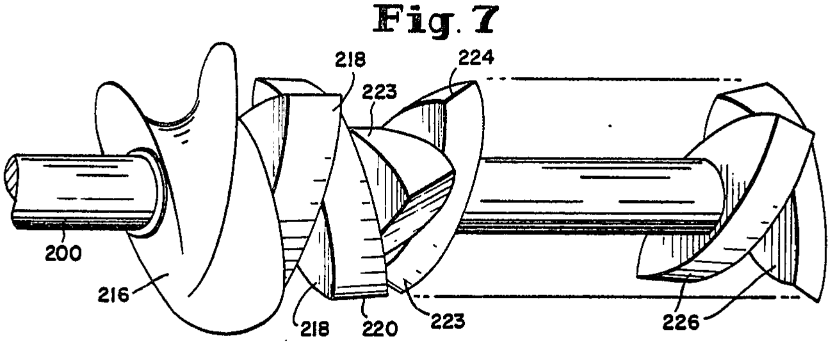
FIG. 7 is a side elevation view of the mixing blades of one of the rotors of the dryer component of FIG. 6.

One preferred embodiment of the rotor and the mixing and advancing elements of the dryer 70 is illustrated in FIGS. 6 and 7. A pair of cooperating rotors 200–200 is arranged for clockwise rotation in the direction of arrows R within dual mixing chambers 202 and 204 defined by a housing 206. The housing includes heating medium passages 208, 209, 210 and 211 forming the heating jacket 72 of FIG. 1. As illustrated in FIG. 6, there is only a small clearance between the crests of the mixing paddles, generally designated 214, and the walls of chambers 202 and 204 and between the closest approach of the intermeshed paddles to each other.

The mixing paddles of the rotor may be comprised of a variety of blades and paddles as illustrated best in FIG. 7. In the arrangement illustrated, helical blade or paddle 216 positively advances the concentrate and the dry particles resulting therefrom toward the dryer outlet. This blade is followed by a pair of mixing paddles 218–218 each having crests 220 extending parallel to the longitudinal axis of the rotor. Next are a pair of mixing and advancing paddles 223–223 with both mix and advance the material being worked and for that purpose have crests 224 extending at an angle of approximately 45° to the rotor axis with the leading edge displaced so as to advance the material. There may also be included along the length of the rotor a fourth pair of paddles 226–226 having crests extending at an angle to the rotor axis with the leading edge displaced in the opposite direction to that of the advancing blades and paddles so as to both mix and retard the advance of the worked material.

Such retard paddles cooperate with the remaining paddles to produce a backward and forward working motion to efficiently shear and subdivide the hardening material. The displacement angle of any retard paddles used should be chosen so as to cause some back mixing without interfering with the overall advance of the material being worked in the dryer. It is to be understood that various combinations of the helical blades and mixing paddles may be employed. Thus, all straight paddles may be employed when a high retention time is desired and all helical paddles may be employed when a low retention time is desired. To suit different requirements of shearing and retention time, the relative number of straight, canted advance and canted retard paddles and advance blades and their arrangement can be suitable varied.

One suitable mixer having blades and mixing elements of the foregoing type is described in U.S. Pat. No. 3,195,868 to Loomans, et al, issued July 20, 1965, and the contents of that patent are expressly incorporated herein by reference. Mixing apparatus of the type illustrated in FIGS. 6 and 7 are manufactured by Baker Perkins, Inc. of Saginaw, Michigan, USA and by Teledyne- Readco in York, Pennsylvania, USA. The Baker Perkins model is known as the Multi-Purpose Mixer and the Teledeyne-Readco model is known as the Continuous Processor.

Figure 8:
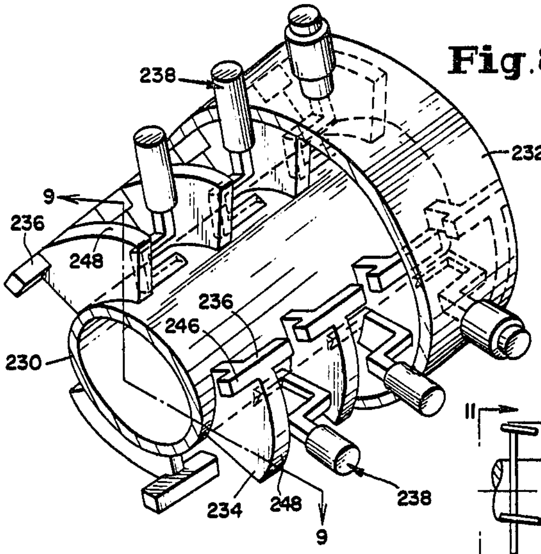
FIG. 8 is a perspective view of another preferred type of rotor and mixing blade arrangement for the dryer component of FIGS. 1 and 2.
Figure 9:
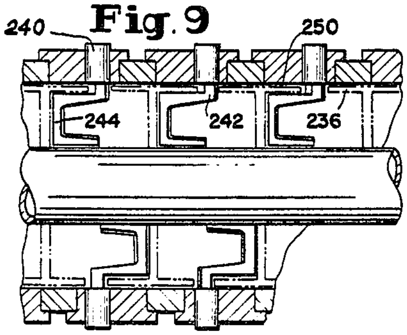
FIG. 9 is a longitudinal cross-sectional view of the dryer component taken along line 9—9 of FIG. 8.

FIG. 8 discloses another preferred embodiment of the dryer rotor and the mixing and advancing elements. In this embodiment, a single rotor 230 is employed and rotates within a single chamber defined by a housing 232 which has a heating jacket similar to that shown in FIG. 6. With reference to FIGS. 8 and 9, the mixing elements carried by the rotor are comprised of transverse paddles 234 and axial bars or paddles 236. Paddle cleaning elements or scrapers 238 are mounted on the housing 232. The scrapers have an enlarged base 240 by which they are mounted within apertures in the housing wall so as to project radially inward as best shown in FIG. 9. The projecting portion of the scrapers include a shank 242 and a C-shaped scraping element 244. The shank 242 passes between the ends of the bars 236 on adjacent paddles and surfaces of the scrapers cooperate with opposing surfaces of the bars, the transverse paddles and the rotor so as to shear crusty layers of dried concentrate from those surfaces.

At the same time, outer surfaces 246 of the bars and outer surfaces 248 of the paddles cooperate with the opposing surface 250 of the heated housing wall to similarly shear crusty material from those surfaces.

Figure 10:
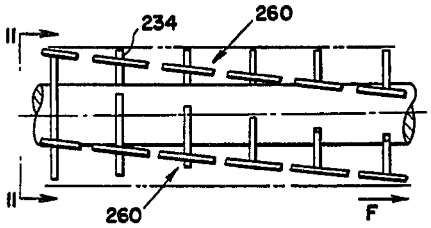
FIG. 10 is a diagrammatic side view in elevation of the rotor and blade elements of the dryer component of FIG. 8.
Figure 11:
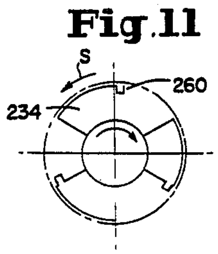
FIG. 11 is a diagrammatic sectional view taken along line 11—11 of FIG. 10.

With reference to FIGS. 10 and 11, it can be seen that each of the bars 236 is displaced at an angle to the rotor axis and that the bars on consecutive paddles cooperate to form an elongated helical member or screw, generally designated 260, which has an over-all cant relative to the rotor axis. In the preferred embodiment shown, there are three rows of paddles 234, each carrying bar elements 236 so as to provide three composite helical members spaced uniformly around the rotor periphery. When the rotor revolves in the counterclockwise direction as shown by arrow S, the helical members 260 cause the material being worked to positively advance in the direction of arrow F toward the outlet of the dryer component 70. Mixing apparatus of the type illustrated in FIGS. 8 through 11 are manufactured by the List Company in Pratteln, Switzerland, the preferred model being of the type Discotherm B.

Other rotor and mixing element combinations may be employed in addition to those described above, provided they perform the same functions in a similar fashion. Thus, the rotor and mixing element combination should include means for positively advancing both the concentrate and the resulting dry particles from the inlet to the outlet of the mixing apparatus to be used as the dryer of the present invention. In addition, the clearances and cooperation between both fixed and moving elements and surfaces should generate sufficient shearing action to remove hardened or crusty layers of concentrate without jamming the rotor. Small clearances of the magnitudes previously discussed are therefore preferred between the cooperating surfaces of mating elements. The relative movement of components mating at such clearances also subdivides solid masses of dried concentrate into fine, powdery particles of waste material. These finely sheared or ground particles have proven especially beneficial when employed with subsequent matrix encapsulation techniques and result in a final waste product with excellent characteristics.

INDUSTRIAL APPLICABILITY

The process and apparatus of the present invention provide a highly efficient and useful volume reduction technique for converting relatively dilute radioactive waste liquids into a substantially dry, powdery solid waste material. The characteristics of this solid waste material are such that it can be easily incorporated by known encapsulation techniques into a variety of matrix materials to yield an encapsulated waste product having excellent characteristics compatible with long term storage in the encapsulated state. The process and apparatus may employ conventional equipement and is capable of utilizing each piece of equipment within the range of its optimum operating parameters. The invention is capable of unusual operating flexibility and can be used to solidify a wide variety of liquid waste effluents, including those from both light water and breeder nuclear power plants, from industrial laboratories and other nuclear industrial complexes, and from the waste treatment plants or nuclear reprocessing facilities.

What is claimed is:

1. A process for enveloping a radioactive waste liquid containing solids, said process comprising the steps of:

chemically treating said waste liquid by adding at least one chemical reagent to adjust the pH of said liquid to greater than 7.0;

concentrating said solids using a thin-film evaporator having a heated wall and means for distributing said waste liquid as a film on said wall to remove a portion of the moisture from said waste liquid and form a liquid concentrate containing a greater concentration of solids than in said waste liquid;

drying said concentrate in a mixing apparatus having a heated wall and rotor means for contacting said heated wall with said concentrate to remove the remaining liquid from said waste and form a solid waste residue, said rotor means including mixing means for shearing said solid waste residue so as to form dry particles and advancing means for engaging said dry particle to positively advance said dry particles toward an outlet of said mixing apparatus; and, enveloping said dry particles of waste material in a second material.

2. The process of claim 1 in which said enveloping step includes intimately mixing said dry particles with said second material to form a substantially homogeneous mixture.

3. The process of claim 2 in which said second material comprises bitumen, synthetic resin, glass or inorganic cement.

4. The process of claim 3 in which said synthetic resin is a thermosetting polyester resin.

5. The process of claim 4 in which said thermosetting polyester resin is formed by copolymerization reactions between an unsaturated glycol monomer, orthopthalic acid, and a styrene monomer.

6. The process of claim 3 in which said inorganic cement contains alumina in an amount of at least 35 weight percent.

7. The process of claim 2 in which said dry particles are substantially free of free water and said second material comprises inorganic cement previously mixed with water to form an aqueous cement slurry, and in which said slurry is subsequently mixed at ambient temperature with said water-free dry particles and said mixture is allowed to set so as to encapsulate said waste solids in a solid concrete matrix.

8. The process of claim 1 which further includes removing entrained particulates from the moisture vapor produced by said evaporator and said mixing apparatus.

9. The process of claim 8 which further includes discharging moisture vapor from said mixing apparatus through said thin-film evaporator.

10. The process of claim 9 in which said thin-film evaporator includes means for removing particulate solids from the moisture vapor produced by both said evaporator and said mixing apparatus.

11. The process of claim 1 in which the concentration of solids in waste liquid fed to said thin-film evaporator is in the range of 1 to 30 weight percent.

12. The process of claim 1 in which the concentration of solids in the concentrate passing from said concentrating step to said drying step is in the range of 30 to 70 weight percent.

13. The process of claim 1 in which said at least one chemical reagent is lime or barium nitrate.

14. The process of claim 1 which further includes the step of evaporating said waste liquid in a second evaporator upstream of said thin-film evaporator.

15. The process of claim 14 in which moisture vapor from said mixing apparatus and said thin-film evaporator is condensed and recycled to said upstream evaporator.

16. The process of claim 1 in which a portion of said waste liquid bypasses said thin-film evaporator and is fed directly to said mixing apparatus.

17. The process of claim 2 in which at least a portion of the mixing of said dry particles with said second material takes place in a portion of said mixing apparatus downstream of a drying portion.

18. The process of claim 2 in which the relative proportion of said dry particles to said second material is in the range of 40 to 70 weight percent.

19. The process of claim 1 in which said mixing means includes an elongated rotor and said advancing means includes helical means carried by said rotor, said helical means being canted relative to the axis of said rotor and arranged so as to positively advance both said concentrate and said dry particles toward the outlet of said mixing apparatus.

20. The process of claim 1 in which said concentrate upon drying forms a hardened layer upon said heated wall and said mixing means, and in which said mixing apparatus further includes means for removing said hardened layer of dried concentrate from said wall and said mixing means.

21. The process of claim 1 in which said chemical treating step adjusts the pH of said waste liquid to greater than 10.

22. The process of claim 21 in which said chemical treating step adjusts the pH of said waste liquid to a value within the range of 10 to 12.

23. The process of claim 2, in which said substantially homogeneous mixture is discharged into a container having a wall of water impervious material.

24. The process of claim 1 in which said chemical treatment step is carried out after said solids are concentrated in said thin-film evaporator.

25. The process of claim 24 in which both said chemical treatment step and said drying step are carried out in said mixing apparatus.

26. The process of claim 25 in which said chemical reagent is added in a dry state to said liquid concentrate.

27. The process of claim 1 in which said chemical reagent is added in a dry state to said waste liquid.

28. The process of claim 1 in which the dry particles of waste material are calcinated before enveloping them in a second material.

29. An improvement in the process for solidifying a radioactive waste liquid containing solids wherein the pH of said waste liquid is adjusted to greater than 7.0 by the addition of at least one chemical reagent and said chemically treated waste liquid is heated to solidify said solids by evaporating said liquid, said improvement comprising pretreating said waste liquid so as to form a concentrate containing said solids in an amount of at least 35 weight percent and subsequently feeding said concentrate to a heated mixing apparatus to evaporate said liquid and form dry particles of said solids, said heated mixing apparatus comprising a heated wall for evaporating said liquid from said concentrate so as to form dry solid material; rotor means for working said solid material to form dry particles, said rotor means including a plurality of paddles for working said material and means for positively advancing said concentrate and said dry particles toward the outlet of said mixing apparatus; and means for shearing hardened layers of said concentrate from said heated wall, said helical means, and said working paddles.

30. The improvement of claim 29 in which said waste liquid is pretreated in a thin-film evaporator to form said concentrate, said thin-film evaporator including a heated wall to evaporate a portion of the moisture from said waste liquid so as to form a liquid concentrate containing at least 35 weight percent solids, means for distributing said waste liquid as a film on said heated wall, and means for causing said film to be removed from said heated wall before said concentrate contains less than 30 percent moisture.

31. The process of claim 1 in which said mixing means includes at least one mixing member and at least one cleaning member, said mixing member cooperating with said cleaning member and said heated wall so as to shear said solid waste residue and form said dry particles.

32. The process of claim 31 in which at least a portion of said advancing means is carried by said at least one mixing member.

33. The process of claim 1 in which said mixing means includes a plurality of mixing paddles for shearing said solid waste residue between said paddles and said heated wall and between different ones of said paddles so as to form said dry particles.

34. The process of claim 1 in which said solid waste material is dried in said mixing apparatus until said waste particles are substantially free of free water; and in which said enveloping step includes adding dry cement and separately adding water to said waste particles and intimately mixing said waste particles, said cement, and said separately added water so as to encapsulate said waste material in a concrete matrix.

35. The process of claim 1 in which said drying step includes continuously drying said concentrate until said waste particles are substantially free of free water, and in which said enveloping step includes continuously mixing said waste particles with a matrix material to form a substantially homogeneous mixture and then solidifying said matrix material.

36. The process of claim 35 in which both said continuous drying step and said continuous mixing step are carried out in said mixing apparatus.

37. The process of claim 36 in which said matrix material is comprised of at least two different ingredients, and in which said enveloping step includes adding said at least two different ingredients separately to said waste particles at different points of addition separated circumferentially and/or axially from each other.

38. The process of claim 37 in which said at least two ingredients are dry cement and water.

39. The process of claim 37 in which said at least two ingredients include at least two different chemical compositions for the formation of a synthetic resin matrix.

40. An apparatus for enveloping radioactive waste liquid containing solids comprising:

- means for treating said waste with at least one chemical reagent to adjust the pH of said liquid to greater than 7.0;
- thin-film evaporator means for concentrating said waste liquid, said thin-film evaporator means having a heated wall and rotor means for distributing said waste liquid as a thin-film on said wall so as to evaporate moisture from said waste and form a liquid concentrate containing a greater concentration of solids than in said waste liquid;
- a heated mixing apparatus having a heated wall for drying said concentrate and rotor means for contacting said heated wall with said concentrate to remove the remaining liquid from said waste and form a solid waste residue, said rotor means including a plurality of mixing paddles for shearing said solid waste residue between said paddles and said heated wall and between different paddles so as to form dry particles, and advancing means for engaging said dry particles to positively advance said dry particles toward an outlet of said mixing apparatus;
- means for discharging said concentrate from said thin-film evaporator to said mixing apparatus;
- means for causing said waste liquid to pass through said thin-film evaporator and said concentrate to be discharged to said mixing apparatus so that the concentrate received by said mixing apparatus contains at least 30 weight percent moisture; and,
- means for enveloping said dry particles of waste solids in a second material.

41. The apparatus of claim 40 in which said heated mixing apparatus includes a drying section for forming dry waste particles substantially free of free water and a matrix mixing section downstream of said drying section for forming a substantially homogeneous mixture of said waste and a matrix material comprised of at least two ingredients; and in which said enveloping means includes means for introducing one of said matrix ingredients into said matrix mixing section at one position, separate means for introducing the other of said matrix ingredients into said matrix mixing section at another position spaced circumferentially and/or axially from said position for introducing said one matrix ingredient, and means for solidifying said matrix material so as to encapsulate said waste particles in said matrix material.

42. The apparatus of claim 41 in which said one matrix ingredient is dry cement and said other matrix ingredient is water.

43. The apparatus of claim 41 in which said one matrix ingredient is a first chemical composition and said other matrix ingredient is a second chemical composition for forming a synthetic resin matrix with said first chemical composition.

44. The improvement of claim 29 in which said dry waste particles are enveloped in bitumen, synthetic resin, glass or inorganic cement.

45. The improvement of claim 29 in which said dry waste particles are calcined.

* * * * *